United States Patent [19]

Drew

[11] 3,967,797

[45] July 6, 1976

[54] ELECTRICALLY ACTIVATED PENDANT RELEASE MECHANISM

[75] Inventor: Gene R. Drew, El Centro, Calif.

[73] Assignee: The United States of America as represented by the Secretary of the Navy, Washington, D.C.

[22] Filed: Jan. 8, 1975

[21] Appl. No.: 539,472

[52] U.S. Cl. .......................... 244/151 B; 24/211 N; 244/141
[51] Int. Cl.² .......................................... B64D 17/30
[58] Field of Search ........ 244/151 R, 151 A, 151 B, 244/122 B, 122 AD, 141; 24/211 N, 230 R, ; 89/1 B; 285/3, 4, 18; 403/15

[56] References Cited
UNITED STATES PATENTS

| 3,032,356 | 5/1962 | Botsford | 285/3 |
| 3,277,785 | 10/1966 | Clayton | 89/1 B |
| 3,430,305 | 3/1969 | Geffner | 24/211 N |
| 3,433,440 | 3/1969 | Stanley | 244/122 AD |
| 3,567,158 | 3/1971 | Coyle | 244/122 B |
| 3,872,556 | 3/1975 | Frost | 244/151 B |

FOREIGN PATENTS OR APPLICATIONS

| 979,155 | 4/1951 | France | 244/151 B |

Primary Examiner—Duane A. Reger
Assistant Examiner—Barry L. Kelmachter
Attorney, Agent, or Firm—R. S. Sciascia; G. J. Rubens

[57] ABSTRACT

A release mechanism is provided for separating a pendant from a load that is operable by an electrical pyrotechnic squib activated by an electrical signal from a remote control station. The pyrotechnic squib is mounted within the yoke connector of a harness fitted to the load. The load is an aircrewman who is to be propelled from a cockpit by a rocket.

1 Claim, 3 Drawing Figures

ELECTRICALLY ACTIVATED PENDANT RELEASE MECHANISM

BACKGROUND OF THE INVENTION

This invention relates to release mechanisms, and more particularly to release mechanisms that are electrically activated from a remote control station.

Many current personnel-type ejection systems in the U.S. Navy employ a rocket for propelling the aircrewman from the cockpit. In the more simple installations the rocket is attached to the aircrewman by means of a rope lanyard or pendant releasibly connected by a yoke or clevis connector to the aircrewman's harness. After ejection of the aircrewman the pendant is released from the harness connector by a pendant disconnect activator (PDA) which consists of a gas generator mounted to the airman's head rest frame. The gas generator is connected to the yoke connectors located on each side of the aircrewman's harness through two long flexible fluid hoses by which gas pressure is transmitted to the yoke connectors to effect release of the rocket pendant.

Such a design requires relatively long gas transmission lines that extend along the harness risers and, besides being bulky and cumbersome, requires an extra volume of gas, necessitating a larger gas generator, which further increases the weight of the release system. Furthermore, the size of the gas generator must also take into consideration any gas leakage that may occur in the gas lines and their connections.

Other aircrew extraction systems employ line cutters to separate the extractor rocket. However, as such rocket pendants lines can be one-half inch or more in diameter, the size of the cutters that must be employed to sever such thick pendants introduces the same weight factor.

SUMMARY OF THE INVENTION

An improved pendant release is provided particularly suited for a crewman extraction rocket that enables the escape system to be lighter in weight, more reliable, and less bulky and cumbersome in its association with the aircrewman's harness.

These advantages are achieved in effect by mounting the gas generator, such as a pyrotechnic squib, in the harness yoke connector, instead of at a remote location in the seat frame. In addition, the activation of the gas generator is performed electrically through conductors from the remote control station, enabling the elimination of long gas transmission lines. The rocket pendant is anchored by an end fitting which releasibly fits into a socket in the yoke connector. Gas pressure created by the gas generator effects the release of the end fitting from the yoke connector to separate the pendant and its rocket from the shoulder harness. Release of the pendant end fitting is accomplished by a pressure operated piston which releases a set of ball bearing normally wedging the fitting within the yoke connector.

STATEMENT OF THE OBJECTS OF THE INVENTION

Principal objects of this invention are to provide a pendant release suitable for a parachute shoulder harness that is lighter in weight, more reliable, more simple, less expensive, and which is less cumbersome to the aircrewman when attached to his parachute harness.

Other objects, advantages and novel features of the invention will become apparent from the following detailed description of the invention when considered in conjunction with the accompanying drawings.

DESCRIPTION OF THE PREFERRED EMBODIMENTS

Figure 1:
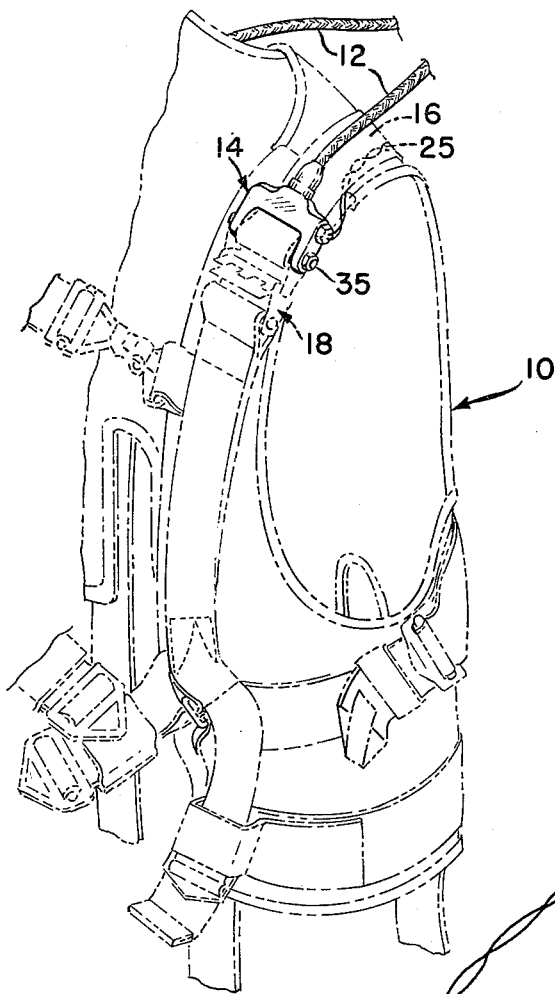
FIG. 1 is a front perspective view of an upper left portion of the shoulder parachute harness showing generally its connection to the rocket pendant.

Referring to the drawings where like reference numerals refer to different parts throughout the figures there is shown in FIG. 1 an upper portion of a typical personnel-type parachute harness 10 showing how the invention release system is attached thereto. To simplify the drawing only the left side of the harness is illustrated and described, although it should be understood that the right side of the harness is identical thereto. A pair of pendants 12, which may be ½ inch ropes, are attached at their upper ends through a bridle connection to an extraction rocket (not shown), being attached at their lower ends by means of yoke connectors 14 to harness riser straps 16 through conventional male-female harness releases 18.

This type of crew escape system is well known in the parachute art and is utilized currently in a number of different type of military personnel type escape systems for propelling the aircrewman and seat assembly from the cockpit of a disabled aircraft.

The instant invention is directed to an improved pendant release mechanism 22 that is lighter, more simple, and more reliable.

Figure 2:
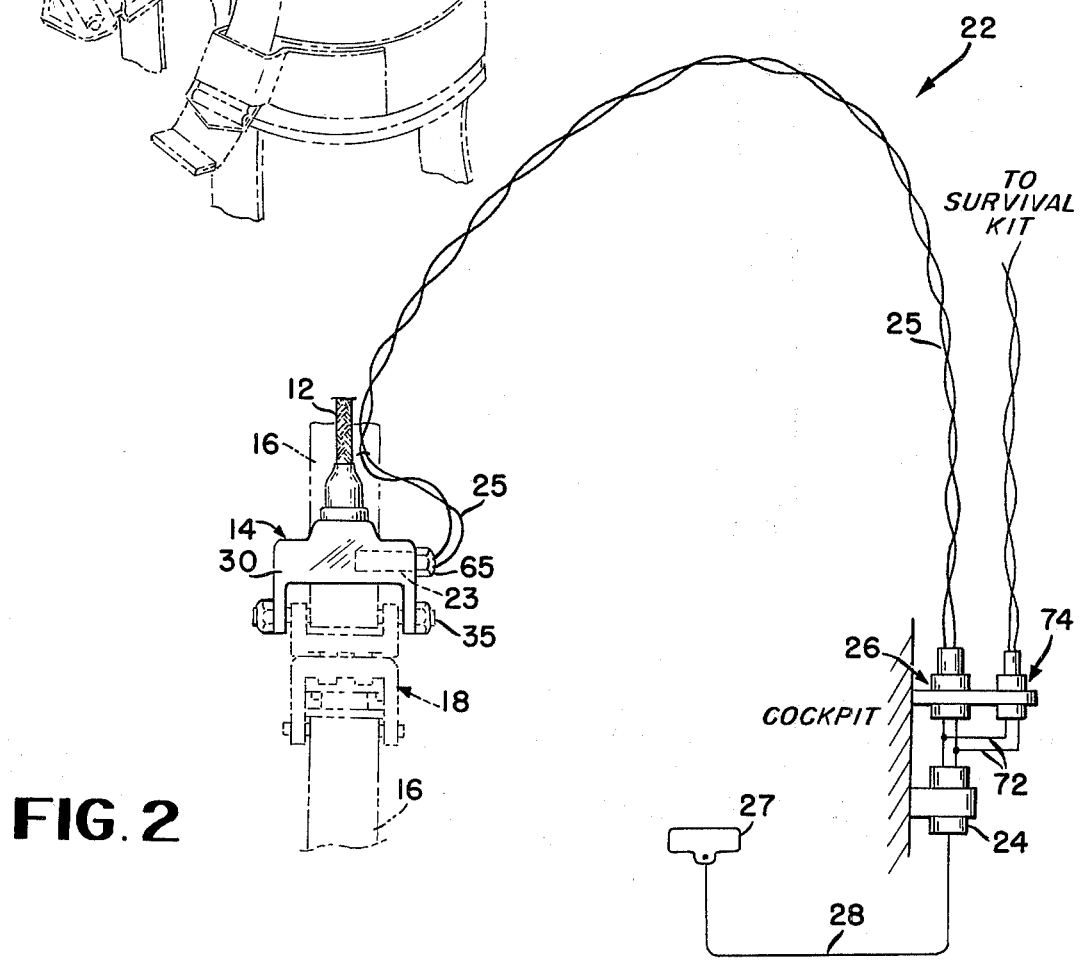
FIG. 2 is a general schematic of the release system.

Release mechanism 22 is illustrated in FIG. 2 and generally comprises a redesigned yoke connector 14 having a built-in source of gas pressure 23; a source of electrical energy, such as a conventional thermal battery 24 made by the Eagle-Pitcher Company and connected to gas source 23 by electrical wires 25 and connectors 26; and a means for activating the energy source, such as a conventional aircrewman extraction escape handle 27 connected to thermal battery 24 by a lanyard 28. The thermal battery can be located in the cockpit console (not shown).

One of the important advantages of the present invention is that the electrical conductors 25, which extend between the thermal battery 24 and yoke connector 14, being narrow and flexible, can be arranged in a protected position between the harness straps, not possible with heavy gas lines.

Figure 3:
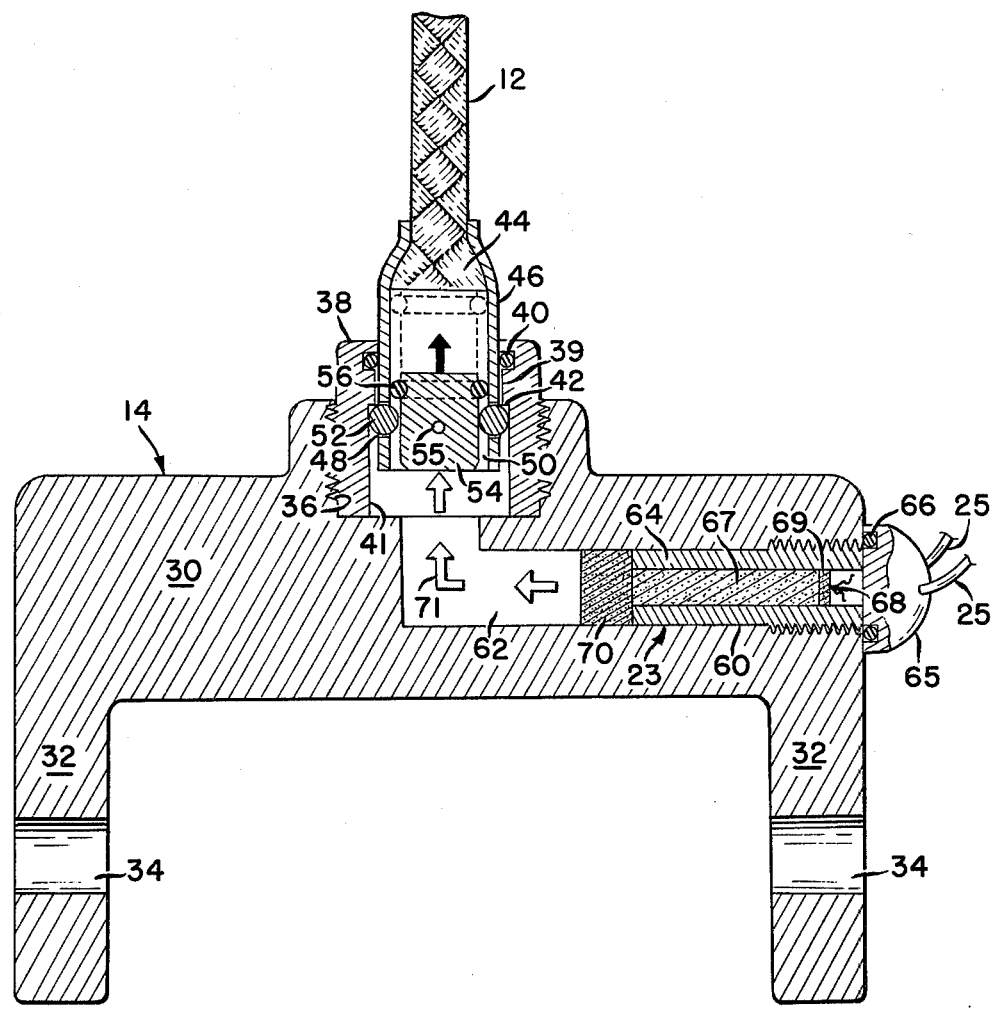
FIG. 3 is a cross-section view of the release yoke connector.

The details of connector 14 are shown in FIG. 3 and comprises a yoke shaped body portion 30 having spaced legs 32 with transverse drilled openings 34 for pivotal attachment by pin 35 to the male half of harness release 18, as shown in FIG. 1.

Connector body 30 is centrally provided with a bossed opening 36 threadedly receiving a collar 38. Collar 38 has a bore 39 provided with an O-ring gas seal 40 and an enlarged bore portion 41 creating an internal shoulder or seat 42.

The lower end of rocket pendant rope 12 terminates in an enlarged portion 44, which may be formed by melting the rope end, for anchoring to a crimped end of sleeve end fitting 46 which slidably fits in bore 39 and is normally sealed thereto by gas seal 40.

The free end of sleeve fitting 46 projects into enlarged bore 41 and is provided with a plurality of transversely drilled openings 48, four to eight being suitable, which extend through the sleeve wall into its bore 50.

Ball bearings 52 are positioned in openings 48 and are maintained therein seated against shoulder 42 by a piston 54 movably positioned within sleeve bore 50 at the end thereof opposite and adjacent ball bearings 52. In this position of piston 54, the ball bearings are wedged against shoulder 42 of collar 38 to lock the pendant 12 to yoke fitting 30. Piston 54 is maintained in the illustrated ball-bearing-blocking position by a shear pin 55. The length of sleeve bore 50 is at least twice the length of piston 54 so that the piston can be moved to an inner inactive position, shown by broken lines in FIG. 3. With piston 54 moved to its innermost position, ball bearings 52 are free to be displaced laterally inwardly, out of engagement with shoulder 42. This inward movement of ball bearings 52 frees pendant fitting 46 for separation and jettisoning along with its rocket.

Piston 54 is displaced from its lower to upper or innermost position by gas pressure from a source 23, such as an electrical pyrotechnic squib, which fits in the outer end of horizontally drilled hole 60 in yoke body 30. The remaining portion of hole 60 forms a gas plenum chamber 62 leading to bores 41 and 50 and to the lower face of piston 54.

Electrical squib 23 is of conventional design and comprises a casing 64 threadedly fitting within hole 60, casing 64 being provided with a cap 65 sealed to the yoke body by an O-ring 66. Casing 64 houses a delay powder charge 67 which is ignited by a bridge wire 68 via an ignition charge 69, connected by conductors 25 which extend through cap 65 to thermal battery 24. A booster charge 70 is positioned in hole 60 adjacent delay charge 67, and is ignited thereby to provide the working gas pressure to displace piston 54. Powder charge 67 is an end-burning type that provides a time delay before igniting booster charge 70. In the illustrated embodiment, powder charge 67 is designed to provide a delay of about 1 second, or slightly less, which will allow sufficient time to enable the extraction rocket to perform its extraction action before pendant 12 is released.

The operation of the novel release system is best described with reference to FIGS. 2 and 3, and the description directed to the illustrated side of the harness will apply equally to the other side of the harness. When the aircrewman decides to abandon his disabled aircraft, after initiating required pre-ejection functions, he initiates his extraction by pulling on extraction escape handle 27. Tension on lanyard 28 activates thermal battery 24 which generates an electrical current that is transmitted by conductors 25 via connectors 26 to electrical squib 23. Conductors 25 being arranged to extend between and along the harness straps are protected from possible damage from handling and use of the parachute harness.

The electrical current from battery 24 ignites bridge wire 68 which in succession ignites charge 69 and delay charge 67. Charge 67 burns for a predetermined time period to provide a delay train before igniting booster charge 70. This time delay will ensure that the aircrewman will have been extracted by the extraction rocket clear of the cockpit before the rocket is jettisoned along with pendant 12 by invention release mechanism 22.

Booster charge 70 explodes and generates a gas pressure in plenum chamber 62, indicated by arrows 71, of sufficient magnitude on piston 54 to shear pin 55 and advance piston 54 fully into pendant sleeve 50 and to a position entirely beyond ball bearings 52. Ball bearings 52 are now free to be forced inwardly into bore 50 vacated by piston by the tension on pendant 12. End fitting 46 and its pendant are now free of yoke collar 38 and is pulled clear by the rocket.

Electrical energy from thermal battery 24 can also be utilized to initiate other actions associated with aircrewman extracted, such as release of a survival kit (not shown), by means of conductors 72 and connectors 74.

The release means proposed by this invention provides apparatus which is lighter in weight, more simple in construction, more reliable in operation, and less likely to become damaged in normal use.

Obviously many modifications and variations of the present invention are possible in the light of the above teachings. It is therefore to be understood that within the scope of the appended claims the invention may be practiced otherwise than as specifically described.

What is claimed is:

1. A release mechanism for connecting an extraction rocket pendant to a parachute harness comprising:
   a connector fitting adapted to be attached to a parachute harness;
   separable means for connecting the pendant to the connector, a manual actuating means,
   a thermal battery operably connected to the manual means for generating an electrical current,
   a pyrotechnic device mounted in the connector responsive to said electrical current for producing explosively a fluid pressure;
   said battery being connected to the pyrotechnic device by electrical conductors;
   said pyrotechnic device having means for delaying for a predetermined period of time the initiation of said fluid pressure,
   said separable means being responsive to the fluid pressure to release the pendant.

* * * * *